United States Patent
Fayazi-Azad

(10) Patent No.: US 9,763,394 B2
(45) Date of Patent: Sep. 19, 2017

(54) MULTI-LANGUAGE IRRIGATION CONTROLLER AND METHOD OF PROGRAMMING

(71) Applicant: Rain Bird Corporation, Azusa, CA (US)

(72) Inventor: Sean Fayazi-Azad, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 409 days.

(21) Appl. No.: 14/334,555

(22) Filed: Jul. 17, 2014

(65) Prior Publication Data

US 2016/0014981 A1    Jan. 21, 2016

(51) Int. Cl.
| | | |
|---|---|---|
| *G06F 3/00* | (2006.01) | |
| *A01G 25/16* | (2006.01) | |
| *G06F 3/01* | (2006.01) | |
| *G05B 15/02* | (2006.01) | |

(52) U.S. Cl.
CPC ............ *A01G 25/16* (2013.01); *G05B 15/02* (2013.01); *G05B 2219/35504* (2013.01)

(58) Field of Classification Search
CPC .... A01G 25/16; G06F 9/4448; G06Q 10/109; B60K 35/00
See application file for complete search history.

(56) References Cited

U.S. PATENT DOCUMENTS

| | | | |
|---|---|---|---|
| 4,171,610 A | 10/1979 | Gilomen | |
| 4,901,065 A | 2/1990 | Cerruti | |
| 5,416,903 A | 5/1995 | Malcolm | |
| 5,740,801 A * | 4/1998 | Branson | G06F 19/321 |
| | | | 128/920 |
| 5,917,484 A | 6/1999 | Mullaney | |
| 6,240,336 B1 * | 5/2001 | Brundisini | G05B 19/0426 |
| | | | 239/436 |
| 6,611,708 B1 | 8/2003 | Morgan | |
| 6,805,506 B2 | 10/2004 | Bar-Yona | |
| 7,941,484 B2 | 5/2011 | Chandler | |
| 8,160,750 B2 | 4/2012 | Weiler | |
| 8,564,233 B2 | 10/2013 | Kidd | |
| 2006/0282773 A1 | 12/2006 | Kim | |
| 2006/0293797 A1 | 12/2006 | Weiler | |
| 2007/0124675 A1 | 5/2007 | Ban | |
| 2007/0186159 A1 | 8/2007 | Yang | |
| 2008/0027587 A1 * | 1/2008 | Nickerson | A01G 25/16 |
| | | | 700/284 |

(Continued)

*Primary Examiner* — Nicholas Augustine
(74) *Attorney, Agent, or Firm* — Fitch, Even, Tabin & Flannery LLP

(57) ABSTRACT

Some embodiments comprise irrigation controllers, comprising: a first set of functional inputs with each functional input of the first set of functional inputs exclusively corresponding to a first language; and a second set of functional inputs with each functional input of the second set of functional inputs exclusively corresponding to a second language that is different that the first language; wherein each of the functional inputs of both the first set of the functional inputs and the second set of the functional inputs are available for activation by a user at the same time, and wherein each function correlated with one of the functional inputs of the first set of functional inputs is also correlated with a corresponding one of the functional inputs of the second set of functional inputs.

21 Claims, 9 Drawing Sheets

(56) References Cited

U.S. PATENT DOCUMENTS

| | | |
|---|---|---|
| 2010/0312398 A1 | 12/2010 | Kidd |
| 2011/0173535 A1 | 7/2011 | Royal |
| 2012/0240842 A1 | 9/2012 | Edwards |
| 2012/0290287 A1* | 11/2012 | Fux .................... G06F 3/04883 704/8 |
| 2013/0190935 A1 | 7/2013 | Nickerson |
| 2014/0042955 A1 | 2/2014 | Kidd |
| 2014/0319232 A1* | 10/2014 | Gourlay .............. F24F 11/0086 236/51 |
| 2015/0173725 A1* | 6/2015 | Maxson ................ A61B 17/00 606/1 |

* cited by examiner

MULTI-LANGUAGE IRRIGATION CONTROLLER AND METHOD OF PROGRAMMING

BACKGROUND

1. Field of the Invention

The present invention relates generally to irrigation, and more specifically to irrigation controllers.

2. Discussion of the Related Art

Generally, irrigation controllers are used to control the delivery of water to irrigation devices connected to switchable irrigation valves. To control the delivery of water to groups of irrigation devices that define irrigation stations or zones, conventional program-based irrigation controllers typically provide programs that are used by the irrigation controller to activate one or more valves.

Typically, these irrigation controllers include a user interface. The user interface allows the user to interact with the irrigation controller to define irrigation runtimes.

SUMMARY OF THE INVENTION

Some embodiments comprise irrigation controllers, comprising: a first set of functional inputs with each functional input of the first set of functional inputs exclusively corresponding to a first language; and a second set of functional inputs with each functional input of the second set of functional inputs exclusively corresponding to a second language that is different that the first language; wherein each of the functional inputs of both the first set of the functional inputs and the second set of the functional inputs are available for activation by a user at the same time, and wherein each function correlated with one of the functional inputs of the first set of functional inputs is also correlated with a corresponding one of the functional inputs of the second set of functional inputs.

Further, some embodiments comprise methods of controlling irrigation, comprising: by control circuitry of an irrigation controller configured to control irrigation, detecting an activation of a first functional input of a plurality of functional inputs of the irrigation controller; causing information corresponding to a function associated with the first functional input to be displayed on a display of the irrigation controller in only a first language when the first functional input is one of a first set of multiple functional inputs of the plurality of functional inputs with each functional input of the first set of functional inputs exclusively corresponding to the first language; and causing the information corresponding to the function associated with the first functional input to be displayed on a display of the irrigation controller in only a second language when the first functional input is one of a second set of multiple functional inputs of the plurality of functional inputs with each functional input of the second set of functional inputs exclusively corresponding to the second language that is different that the first language; wherein each of the functional inputs of both the first set of the functional inputs and the second set of the functional inputs are available for activation by a user at the same time, and wherein each function correlated with one of the functional inputs of the first set of functional inputs is also correlated with a corresponding one of the functional inputs of the second set of functional inputs.

Still further, some embodiments comprise method of controlling irrigation, comprising: by control circuitry of an irrigation controller configured to control irrigation, providing, on the irrigation controller, a first set of functional inputs with each functional input of the first set of functional inputs exclusively corresponding to a first language, wherein the first set of the functional inputs comprises multiple functional inputs; and providing, on the irrigation controller, a second set of functional inputs with each functional input of the second set of functional inputs exclusively corresponding to a second language that is different that the first language, wherein the second set of the functional inputs comprises multiple functional inputs; wherein each of the functional inputs of both the first set of the functional inputs and the second set of the functional inputs are available for activation by a user at the same time, and wherein each function correlated with one of the functional inputs of the first set of functional inputs is also correlated with a corresponding one of the functional inputs of the second set of functional inputs.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
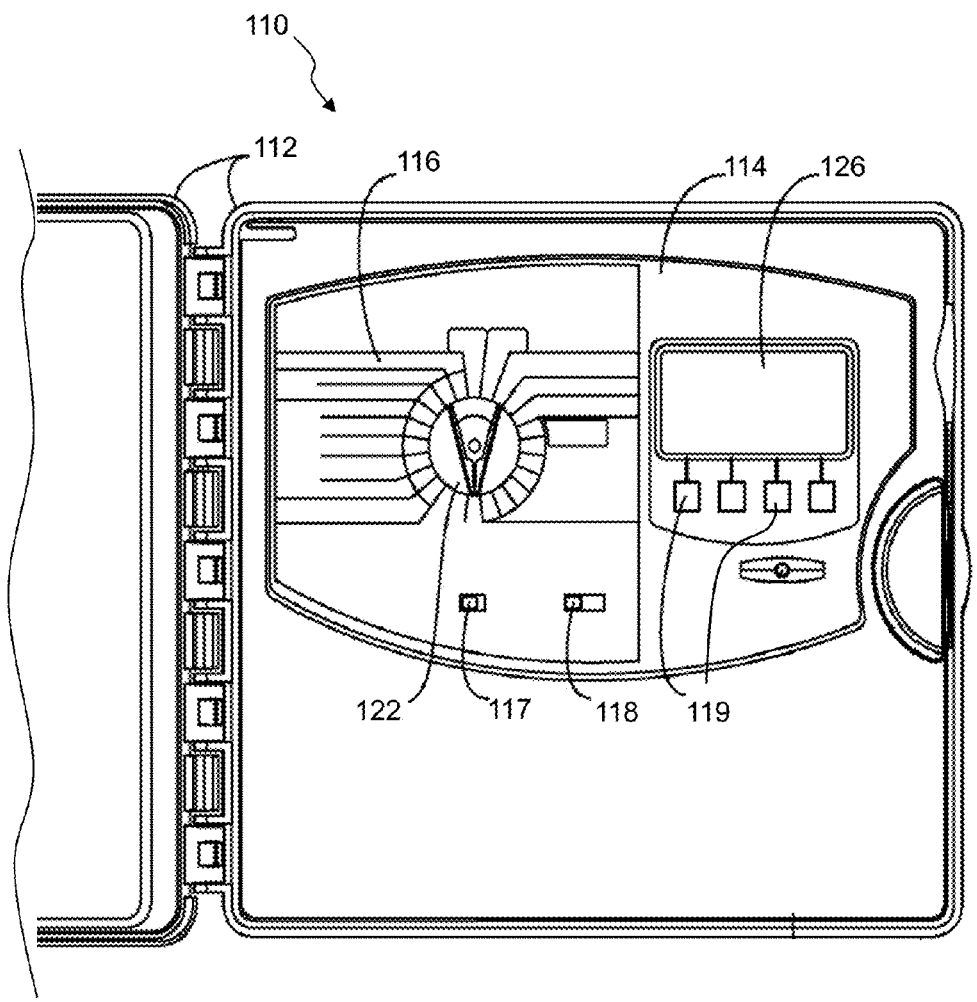
FIG. 1 shows an exemplary irrigation controller, in accordance with some embodiments, with an exemplary user interface and/or control panel.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user activations and/or selections, network transactions, memory and/or database queries, database structures, circuitry, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Irrigation controllers are utilized worldwide to allow users to control the distribution of water. In many instances, multiple users have access to a single irrigation controller to program the irrigation controller, adjust one or more irrigation programs, adjust one or more runtimes, interrupt irrigation, manually force irrigation, obtain information from the irrigation controller, and/or otherwise interact with the irrigation controller. Further, it is common that different users accessing the same irrigation controller may speak and/or read different native languages. For example, a home owner where an irrigation controller is being utilized to control irrigation over the property may speak a first language, while a landscaper, gardener or other person having access to the irrigation controller may speak and/or read a different second native language. As such, it may be difficult for the second user to interact with, program and/or adjust the irrigation controller when the user interface, controls, instructions and other information available at the irrigation controller are only in the first language. In some implementations, irrigation controllers may include a language option that changes the language of some of the information displayed on a display of the irrigation controller. Typically, however, a user must navigate through a series of options displayed in the first language and/or read information in the first language in order to identify and access an option that allows the user to change the display language to a second language. If the user does not understand the first language, it can be extremely difficult for the user to access the option to change the language to a language that the user understands.

Some present embodiments, however, provide irrigation controllers that provide different functional inputs or options that correspond to different languages. For example, a first set of functional inputs may correspond to a first language, while a second set of functional inputs correspond to a second language. This allows different users that speak and/or read different languages to equally use at least some functions of the irrigation controller. Further, in some embodiments, an irrigation controller simultaneously provides the user with access to both the first set of functional inputs and the second set of functional inputs.

FIG. 1 shows an exemplary irrigation controller 110, in accordance with some embodiments, with an exemplary user interface 114 and/or control panel. In some implementations, the irrigation controller 110 includes a housing in which the user interface is positioned, and that typically protects at least the user interface. The irrigation controller includes station outputs and/or station drivers (not shown) configured to couple with one or more external irrigation valves, pumps, lighting and/or other devices to be controlled. The irrigation controller is configured through control circuitry to store one or more irrigation programs and/or irrigation runtimes corresponding to one or more station outputs, and to activate the one or more station outputs to drive and/or trigger one or more external irrigation valves in accordance with the one or more stored irrigation programs and/or runtimes programmed into the irrigation controller. In some embodiments, the irrigation controller 110 may be a modular irrigation controller configured to receive one or more modules into corresponding modular slots or ports of a backplane (e.g., positioned behind the control panel and within the housing 112), where one or more of the modules typically including one or more station outputs.

The user interface 114 includes one or more functional inputs 116-119 that allow a user to interact with the irrigation controller 110 to obtain information from the irrigation controller and/or set one or more parameters. The parameters can correspond to irrigation programs, irrigation runtimes, override instructions, use of sensor information, and the like. The functional inputs 116-119 can include, but is not limited to, one or more buttons, predefined positions of a rotary dial 122, switches, touch screen, options displayed and associated with soft buttons or keys and whose function changes depending on a context displayed (e.g., typically using part of a display to identify their current function), or other such options, or combinations of such option that allow a user to interact with the irrigation controller 112. Further, in some embodiments, the irrigation controller 110 also includes a display 126 that is configured to display information to a user to allow the user to set parameters, program irrigation programs, set and/or adjust irrigation runtimes, obtain information from the irrigation controller, confirm settings and/or parameters and the like. In many implementations, the display 126 is a relatively simple, dot-matrix display, LED and/or LCD display, or the like with limited display capabilities, such as simply textual and numeric display information, basic image graphics or the like.

Figure 2:
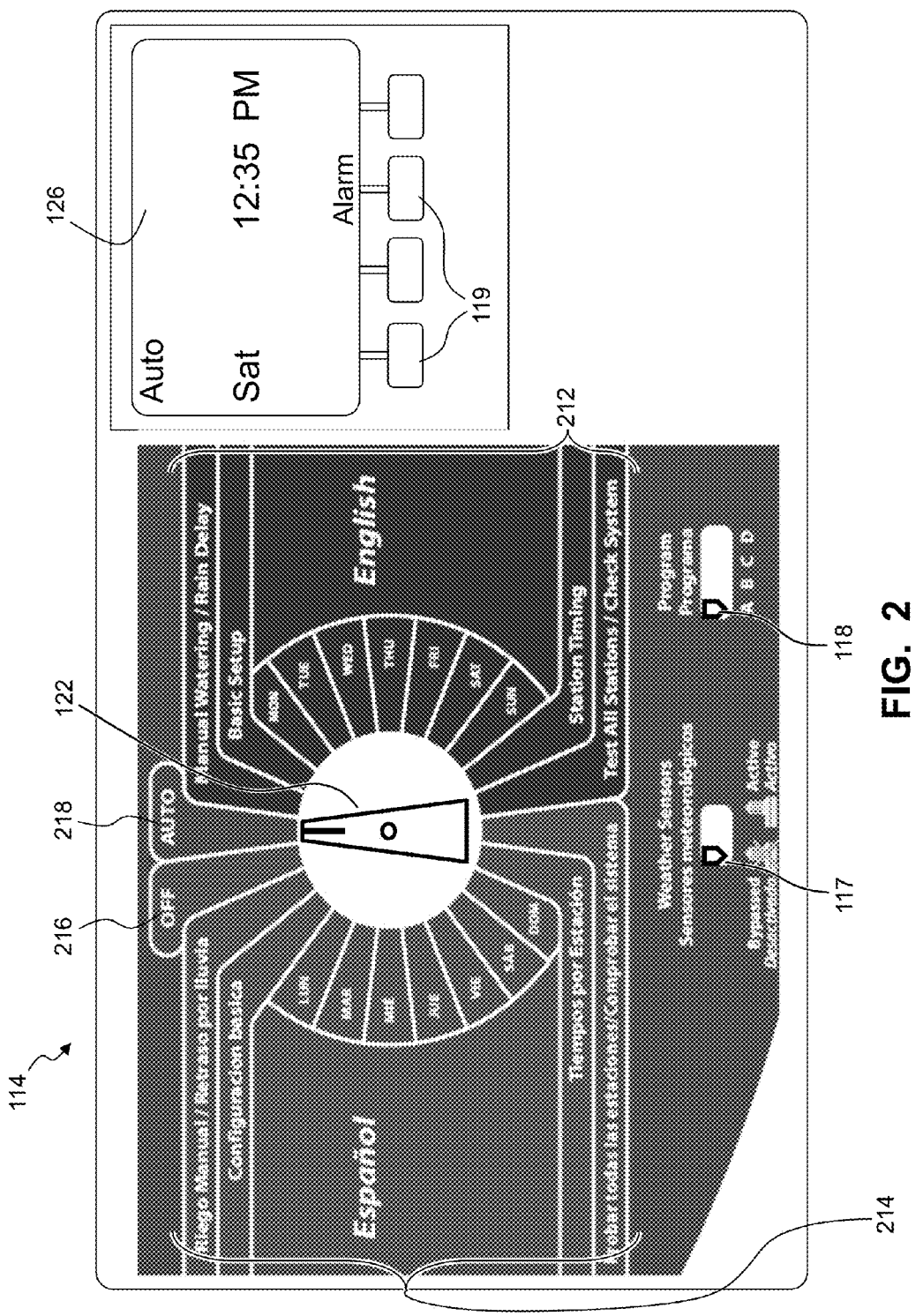
FIG. 2 shows a simplified representation of an exemplary user interface of an irrigation controller, in accordance with some embodiments.

FIG. 2 shows a simplified representation of an exemplary user interface 114 of an irrigation controller 110, in accordance with some embodiments. As introduced above, the user interface 114 includes multiple functional inputs that allow the user to interact with, program and/or obtain information from the irrigation controller 110. In this example, the user interface includes a rotary dial 122 that can be rotated by a user to select and/or activate the different functional inputs that correspond to the rotary dial. The controller can further include one or more buttons or keys 119. In some implementations, the buttons correspond to the display 126 and are considerable "soft buttons" or soft keys and the function associated with each of these soft buttons 119 corresponds to options displayed on the display 126 (e.g., arrow up, arrow down to scroll through a listing of options displayed on the display, a "+" and/or a "−" to adjust numeric values displayed on the display, a "Next" option to advance to subsequent information or user interface displayed on the display, a "Back" option to advance to a previous information of a user interface displayed on the display, and other such options or combinations of such options). Again, the options displayed will correspond to one or more of the soft buttons 119. Further, in some instances, a displayed user interface may not include options corresponding to each soft button, and as such, those soft buttons not associated with a displayed option do not have a corresponding function while that particular displayed user interface is being displayed.

Other functional inputs may include one or more switches 117, 118 that allow the user to select one or more programs, control states, and/or other such options. For example, a first switch 117 may correspond to how the irrigation controller operates when a weather sensor is in communication with the irrigation controller and providing weather data (e.g., bypass or ignore sensor data, interrupt irrigation based on sensor data and/or adjust irrigation based on weather data, and the like). Another switch 118 may allow a user to select between one of multiple different irrigation programs that can be programmed by the user and implemented by the irrigation controller 110. As described in more detail below, the irrigation controller includes one or more processors that access processor readable and/or computer readable memory that stores irrigation parameters (e.g., irrigation programs, runtimes, interrupt information, thresholds, and the like). The processor or a display processor can be further configured to display a displayable user interfaces on the display 126 and/or options corresponding to selected functional inputs.

As introduced above, one or more of the functional inputs may correspond to a first language while one or more other functional inputs may correspond to a second language. This allows different users with different native languages to readily utilize and/or interact with the same irrigation controller 110. For example, still referring to FIG. 2, in some embodiments the user interface 114 may include a first set 212 of functional inputs with each functional input of the first set of functional inputs exclusively corresponding to a first language (e.g., English), and a second set 214 of functional inputs with each functional input of the second set of functional inputs exclusively corresponding to a second language (e.g., Spanish) that is different that the first language. It is noted that the above and below description generally refers to the first language as English and the second language as Spanish. It will be apparent to those skilled in the art, however, that the first and second languages are not restricted to English and Spanish, but can be substantially any two languages. Further, some embodiments may include more than two sets of functional buttons, for example, three or four different sets of functional buttons, with each set corresponding to a different language (e.g., four sets of functional buttons corresponding to English, Spanish, French and German; Japanese, Chinese, Korean and English; etc.).

Typically, the first set 212 and the second set 214 of the functional inputs each comprise multiple functional inputs. For example, the rotary dial 122 may be configured to rotationally transition between predefined positions that each correspond with one of the multiple functional inputs, and control circuitry is configured to detect and distinguish the rotation by the user of the rotary dial to the different predefined dial positions. The functions associated with the first set 212 and the second set 214 of functional inputs can be configured to allow a user to define irrigation programming, runtimes, which days are irrigation days and/or other such irrigation programming Further, in some embodiments, each function correlated with one of the functional inputs of the first set 212 of functional inputs is also correlated with a corresponding one of the functional inputs of the second set 214 of functional inputs. In some implementations, the positioning of at least some of the functional inputs of the first set 212 are mirrored by positioning of at least some of the functional inputs of the second set 214. As one non-limiting example, the functional inputs of the first set 212 can include a "Manual Watering/Rain Delay" functional input that allows a user to manually start irrigation and/or designate whether irrigation is to be delayed for some period of time; a "Basic Setup" function that can allow a user to designate a current date, time, set watering day cycles, set start times, set seasonal adjust value(s), define backup programs and/or other such functions; a Monday (e.g., "MON") functional input that allows a user to designate whether Monday is a watering day (e.g., "allow" irrigation or "prevent" irrigation, which may be designated different for different irrigation programs) and similarly Tuesday ("TUES"), Wednesday ("WED"), Thursday ("THU"), Friday ("FRI"), Saturday ("SAT") and Sunday ("SUN") functional inputs; a "Station Timing" functional input that allows a user to set run times, set up a cycle and soak operation, designate station delays, access other optional settings, and/or other such functions; a "Test All Stations/Check System" functional input that allows the user to access functions to test some or all of the valve drivers and/or other features of the irrigation controller. The user interface 114 can include labeling that correspond to each of predefined positions that are in the first language (e.g., English).

The functional inputs of the second set 214 of functional inputs can correspondingly include similar functional input that exclusively correspond to the second language and are labeled in accordance with the second language. For example, the second set 214 can include a "Riego Manual/Retraso por lluvia" functional input; "Configuracion basica" functional input; a Lunes ("LUN"), Martes ("MAR"), Miércoles ("MIÉ"), Jueves ("JUE"), Viernes ("VIE"), Sábado ("SÁB"), and Domingo ("DOM") functional inputs, a "Tiempos por Estación" functional input, and a "Probar todas las estaciones/Comprobar el sistema" functional input. Again, labeling on the user interface can correspond to each of the predefined positions of the second set of functional inputs with the labeling in the second language (e.g., Spanish).

Table 1 below shows the correlation, in this example, of the functions corresponding to a functional input of each of the first set 212 of functional inputs and the corresponding functional inputs of the second set 214 of functional inputs:

TABLE 1

Corresponding Functional Inputs of First Set
212 and Second Set 214 of Functional Inputs

| First Set 212 of functional inputs: | Second Set 214 of functional inputs: |
|---|---|
| Manual Watering/Rain Delay | Riego Manual/Retraso por lluvia |
| Basic Setup | Configuracion basica |
| MON | LUN |
| TUES | MAR |
| WED | MIÉ |
| THU | JUE |
| FRI | VIE |
| SAT | SÁB |
| SUN | DOM |
| Station Timing | Tiempos por Estación |
| Test All Stations/Check System | Probar todas las estaciones/Comprobar el sistema |

Further, in some embodiments, the functional inputs of both the first set 212 of the functional inputs and the second set 214 of the functional inputs are available at the same time for activation and/or selection by a user. In the example of FIG. 2, the functional inputs of the first set 212 corresponding to a first set of predefined positions of the rotary dial are available at the same time the functional inputs of the first set 212 corresponding to a second set of predefined positions of the rotary dial are available. Furthermore, in some embodiments, the first and second sets of functional inputs are available without the user having to select a separate language option or menu option. Accordingly, in some embodiments, each of the functional inputs of both the first set of the functional inputs and the second set of the functional inputs are available for selection by the user without the user having to select a separate language menu option.

The availability of the different sets of functional inputs each corresponding to a different language allows different users to readily understand the functional inputs and effectively interact with the irrigation controller even though different users may speak different native languages. Further, because the different sets of functional inputs are available without the user having to recognize a language option or navigate to a language option to change a language, the use of the irrigation controller is greatly simplified and enhanced.

In some embodiments, the rotary dial may include predefined positions corresponding to one or more additional functional inputs that are not exclusively associated with the first set 212 or the second set 214. For example, some embodiments may include an "OFF" functional input 216 that allows a user to manually turn off the irrigation controller and/or at least turn off irrigation programs such that the irrigation controller does not activate station outputs or other outputs; an automatic (e.g., "AUTO") functional input 218 that allows the irrigation controller to operate in accordance with user defined irrigation programming and/or default programming; and/or other such functional inputs.

The irrigation controller is typically further configured to display information on the display 126 or provide information to be displayed on a display of a separate device (e.g., user's smartphone) in response to an activation of one or more of the functional inputs. In some embodiments, the information is displayed in the language with which the activated functional input corresponds. For example, when a functional input of the first set 212 of functional inputs is activated, the information is displayed in the first language, while the information is alternatively displayed in the second language when a functional input of the second set 214 is activated. The information corresponding to the activated functional inputs can provide the user with further functional inputs or options and can allow the user in some instances to set or define parameters, set limits, access information and the like.

In some implementations, the irrigation controller and/or control circuitry of the irrigation controller is configured to detect an activation by a user of a functional input (e.g., any of the first and second sets of functional inputs) and direct information corresponding to the function associated with the selected functional input to the display 126 in the language with which the functional input is associated. For example, the control circuitry can in some embodiments be configured to direct information corresponding to a function associated with a selected functional input to be displayed on the display 126 in only the first language when the selected functional input is part of the first set 212 of functional inputs. Similarly, the control circuitry can be configured to direct information corresponding to the function associated with the selected functional input to be displayed on the display 126 in only the second language when the selected functional input is part of the second set 214 of functional inputs.

Figure 3:
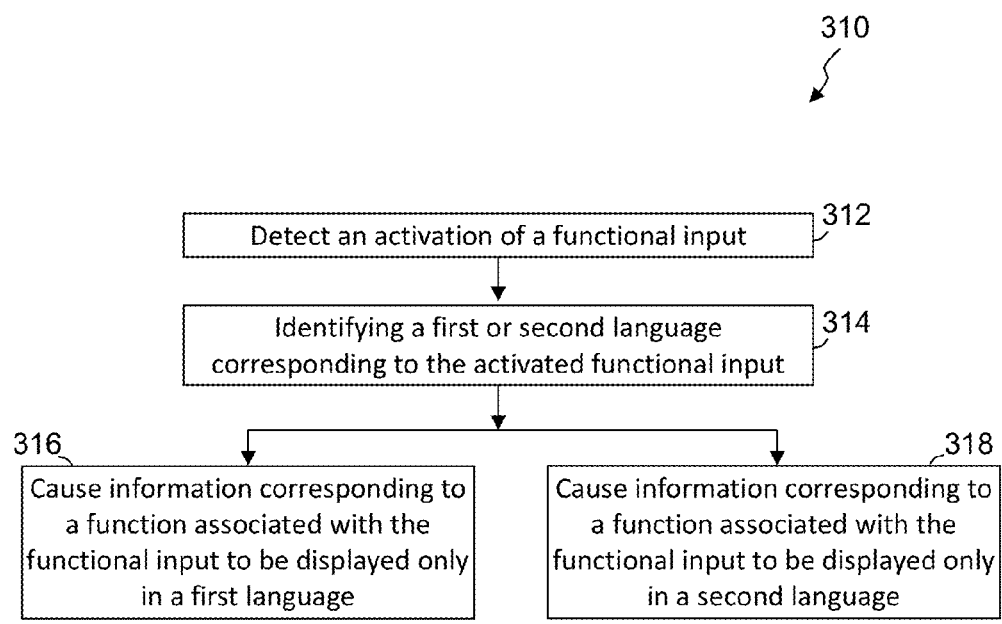
FIG. 3 shows a simplified flow diagram of an exemplary process of allowing a user to interact with an irrigation controller and/or program an irrigation controller, in accordance with some embodiments.

FIG. 3 shows a simplified flow diagram of an exemplary process 310 of allowing a user to interact with an irrigation controller 110 in accordance with some embodiments. In step 312, an activation of a functional input of a plurality of functional inputs of the irrigation controller 110 is detected. Again, typically the irrigation controller includes control circuitry, which may include one or more processors, that detects the activation (e.g., a selection) of a functional input that corresponds to one or more functions that can be performed and/or implemented by the irrigation controller.

In step 314, information corresponding to the function associated with the functional input that was activated is identified. The process 310 then advances to step 316 when the activated functional input is within the first set of functional inputs and causes the information corresponding to the function associated with the activated functional input to be displayed on the display 126 in only a first language when the first set corresponds to the first language. Alternatively, the information corresponding to the function associated with the activated functional input is caused to be displayed on the display 126 in only the second language when the activated functional input is one of the second set functional inputs exclusively corresponding to the second language.

Figure 4A:
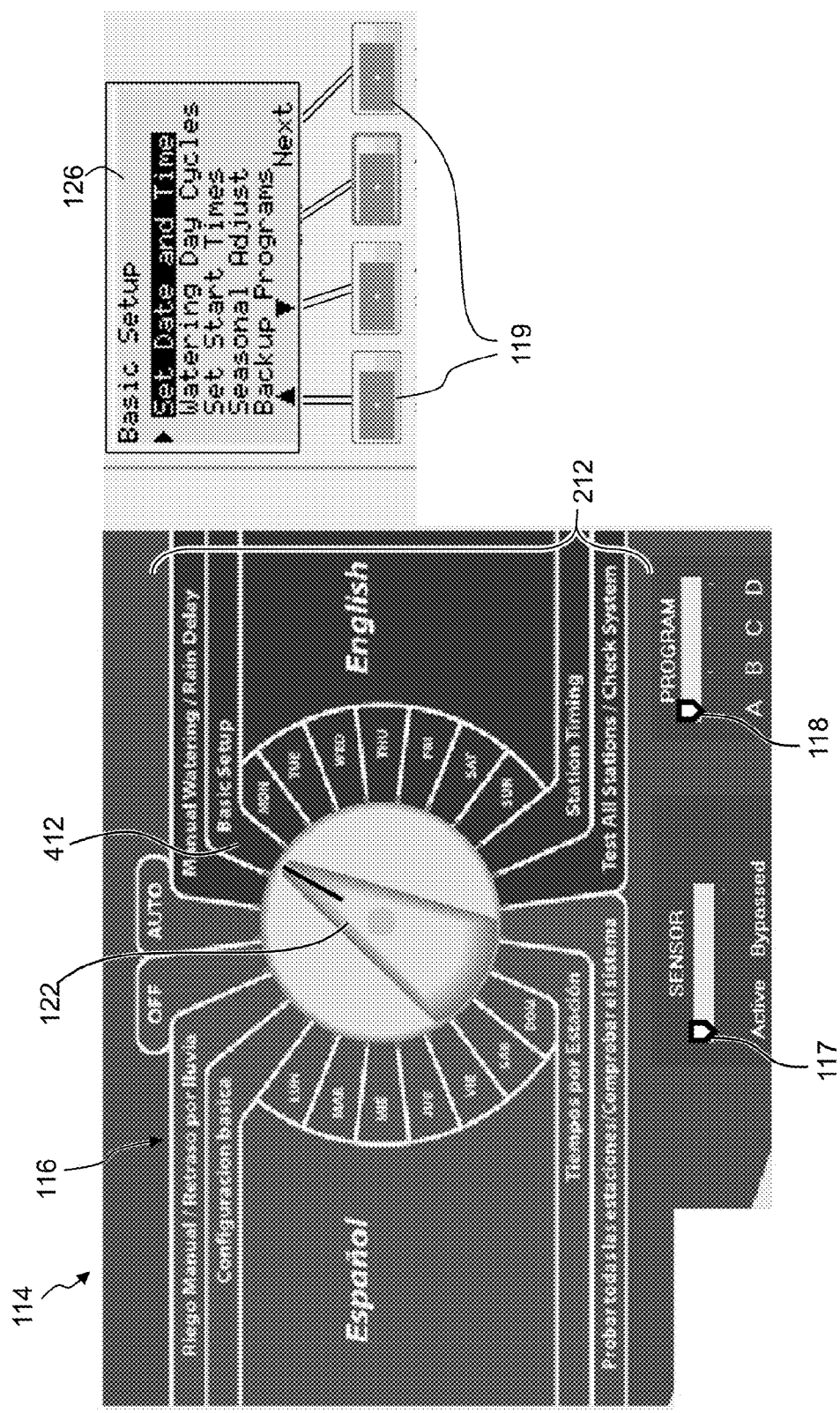
FIG. 4A shows a simplified representation of an exemplary user interface, in accordance with some embodiments, that includes multiple functional inputs with a rotary dial rotated to activate a first functional input corresponding to a first language.

FIG. 4A shows a simplified representation of an exemplary user interface 114, in accordance with some embodiments, that includes multiple functional inputs 116-119 with a rotary dial 122 rotated to activate a first functional input 412 (e.g., a "Basic Setup" functional input). The rotary dial is configured to be rotated by a user to one of a plurality of separate predefined dial positions, where multiple if not all of the dial positions correspond to different ones at least some of the functional inputs. In some implementations, some or all of the first and second sets of functional inputs are each separate dial positions. The user can rotate the dial to a desire functional input in a desired language (e.g., either the first language or the second language).

For example, as depicted in FIG. 4A, the user can select the "Basic Setup" functional input 412 by rotating the dial to align with the position of the "Basic Setup" functional input. The "Basic Setup" functional input, in some implementations, is correlated to a first function or set of functions that exclusively correspond to the first language (e.g., English). The Basic Setup functional input 412, in some implementations, corresponds to functions that allow a user to, for example, set a date and time, set watering day cycles, set one or more irrigation start times, set one or more seasonal adjust parameters, or other such setup functions or combinations of such setup functions. Information corresponding to the setup functions is further displayed in the display 126, and one or more of the soft buttons 119 are configured to correspond with functions to allow the user to navigate through the information displayed on the display. For example, a first soft button may allow a user to advance up in the list of potential functions that can be performed, a second soft button can allow a user to advance down through the list of potential functions and a fourth soft button may be configured to allow a user to select a designated (e.g., highlighted) functional option and/or advance to a subsequent display of information.

In this example, the "Basic setup" functional input options displayed include "Set Date and Time"; "Watering Day Cycles"; "Set Start Times"; and "Seasonal Adjust". The user may utilize, for example, the first and/or second soft buttons to designate or highlight a "Set Date and Time" function and use the fourth soft button to advance to a next display configured to display information, again in the first language based on the activation of first functional input 412, corresponding to the selected functional input option (i.e., in this example, to allow the user to set a date and time).

Figure 4B:
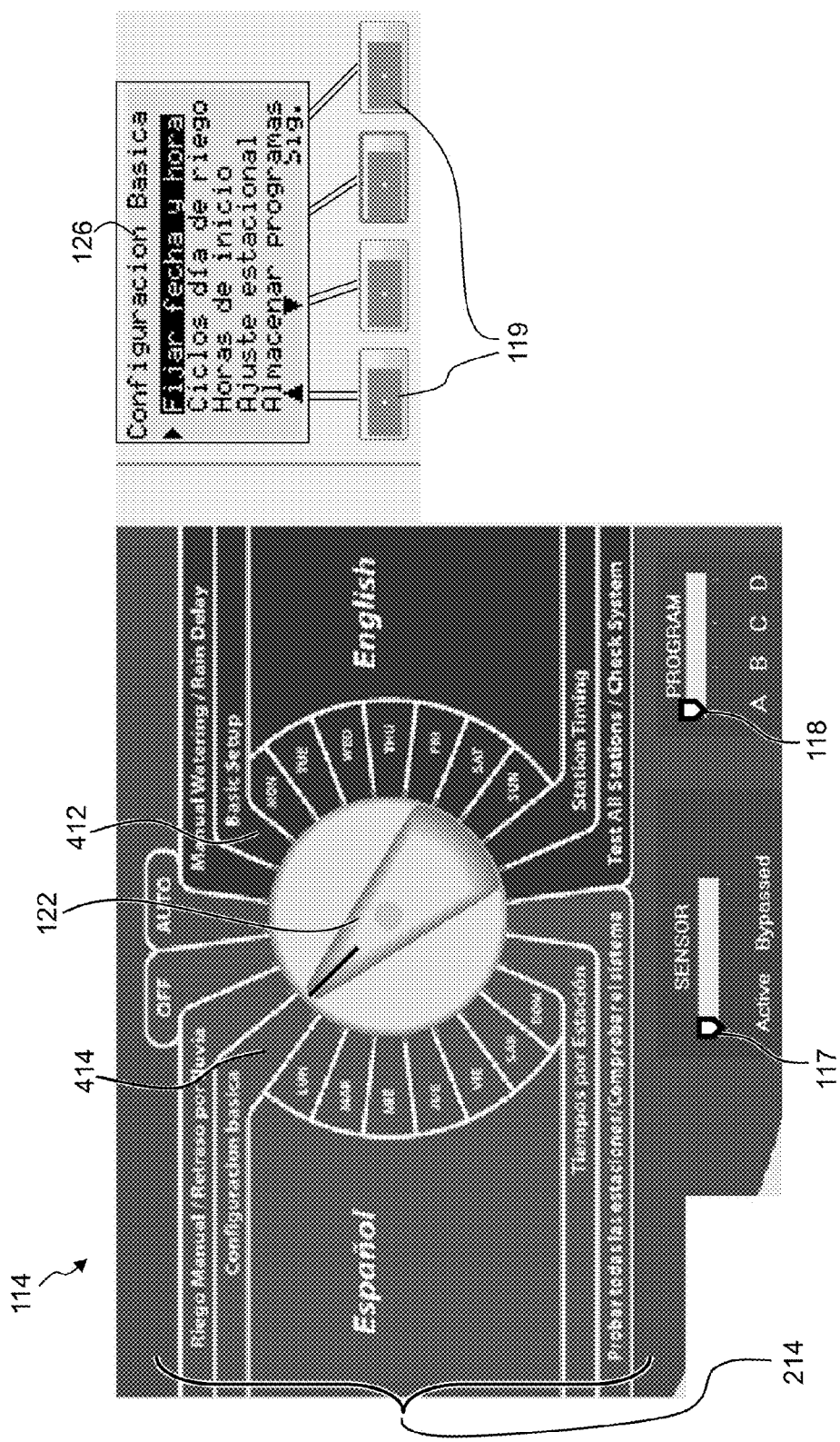
FIG. 4B shows the user interface of FIG. 4A, in accordance with some embodiments, with the rotary dial rotated to activate a second functional input corresponding to a second language.

FIG. 4B shows the user interface 114 of FIG. 4A, in accordance with some embodiments, with the rotary dial 122 rotated to activate a second functional input 414 (e.g., a "Configuracion basica" functional input). The Configuracion basica functional input 414, in this example, is correlated to the second set 214 of functions that exclusively correspond to the second language (e.g., Spanish). As described above, the labeling on the user interface and/or displayed is typically also presented in the second language. The Configuracion basica functional input 414 also corresponds to the same functions as the Basic Setup functional input 412 that allow a user to perform basic setup, such as, set a date and time, set watering day cycles, set one or more irrigation start times, set one or more seasonal adjust parameters, or other such setup functions or combinations of such setup functions. In some implementations, the placement and/or orientation of the Configuracion basica functional input 414 mirrors the orientation of the Basic Setup functional input 412 (e.g., mirrors the Basic Setup functional input 412 relative to the circular configuration of the rotary dial 122).

Further, information corresponding to the function associated with the Configuracion basica functional input 414 is further displayed on the display 126 in the second language. For example, the Configuracion basica functional input options displayed include "Fijar fecha y hora" (corresponding to the "Set Date and Time" in the first language); "Ciclos día de riego" (corresponding to the "Watering Day Cycles" in the first language); "Horas de inicio" (corresponding to the "Set Start Times" in the first language); and "Almacenar programas" (corresponding to the "Seasonal Adjust" in the first language). Again, one or more of the soft buttons 119 can be configured to correspond with functions to allow the user to navigate through the information displayed. Further, in some implementations, the functions associated with one or more of the soft buttons may also be displayed in the second language (e.g., the fourth soft button may be associated with a "siguiente" or next function (displayed as "Sig.")).

Each of the functional inputs of the first set 212 is typically exclusively associated with a single first language at a given time, while each of the functional inputs of the second set 214 of functional inputs is typically exclusively associated with a single second language at a given time that is different than the first language. In some embodiments, the user interface 114 includes one or more additional functional inputs that are not part of the first or second sets of functional inputs, and further may not be exclusively associated with one of the first or second languages. Upon activation or detecting a selection of one of these additional functional inputs, the control circuitry may display information corresponding to the function correlated to the additional functional input in a language that was being used to display the previous information and typically displays the relevant information in the language that was being used at the time the activation of the additional functional input is detected.

Figure 5:
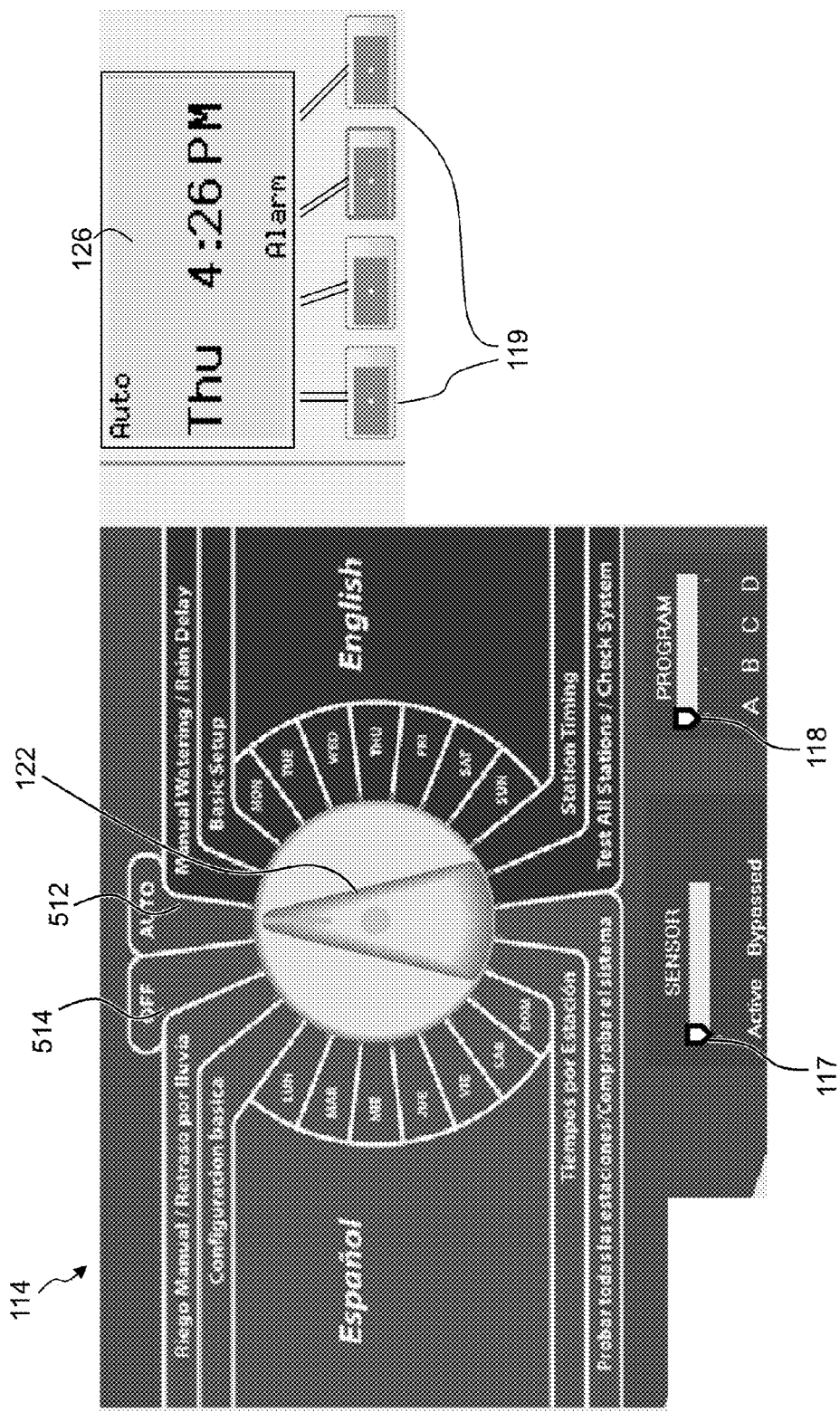
FIG. 5 shows a simplified representation of the exemplary user interface of FIG. 4A, in accordance with some embodiments, with the rotary dial rotated to activate a first additional functional input.

FIG. 5 shows a simplified representation of the exemplary user interface 114 of FIG. 4A, in accordance with some embodiments, with the rotary dial 122 rotated to activate a first additional functional input 512 (e.g., an "AUTO" functional input). In this example, the first additional functional input 512 is not part of the first set 212 or the second set 214 of functional inputs, and further does not exclusively correspond to one of the first language or the second language. Other additional functional inputs may also be included in the user interface, such as but not limited to an "OFF" functional input 514, sensor activation functional input 117, program selector functional input 118, and/or other such additional functional inputs.

In response to detecting an activation of one of these additional functional inputs and when information corresponding to the functional input and/or the function corresponding to the functional input is to be displayed, some embodiments determine which language of a plurality of languages (e.g., which one of the first language and the second language) was associated with the actuation of a most recent functional input that is part of the first or second set of functional inputs and/or the language that was being used in displaying information at the time the activation of the first additional functional input is detected. The information corresponding to the activated additional functional input and/or the function associated with the additional functional input can then be displayed in the language identified as being used at the time the additional functional input was activated and/or the language associated with the most recent activation of a functional input exclusively associated with one of the first or second languages.

For example, in some implementations, a control circuitry and/or display control circuitry can cause additional information corresponding to the additional function correlated to the AUTO additional functional input 512 to be displayed in the first language when it is determined that the first language was being used in displaying the information at the time the activation of the AUTO additional functional input is detected, or cause the additional information corresponding to the additional function correlated to the AUTO additional functional input to be displayed in the second language when it is determined that the second language was being used in displaying the information at the time the activation of the AUTO additional functional input is detected. Additionally or alternatively, the control circuitry can trigger a setting identifying which language is being used based on an activation of a functional input expressly associated with one of the first or second language and continue to use that identified language until a subsequent functional input is activated that corresponds to a different one of the languages, at which time the language setting can be changed.

In the example of FIG. 5, the rotary dial 122 is positioned at the AUTO additional functional input 512 after having been positioned at one of the first set of functional inputs such that the first language (e.g., English) was being used to display the relevant information and/or the language setting was set to the first language. As such, the information displayed relevant to the AUTO additional functional input 512 is displayed, as depicted in FIG. 5, in the first language (i.e., English in this example). Again, the information typically corresponds to the function associated with the selected additional functional input (e.g., the AUTO additional functional input corresponds to an automatic operation such that the irrigation controller tracks a current time and implements irrigation in accordance with irrigation programming based on defined irrigation days, runtimes, start times and/or other such parameters). For example, the display may indicate the irrigation controller is in an automatic mode displaying an "Auto" indication, while displaying a current day and time (e.g., "Thu 4:26 PM").

Alternatively, had the previous information been displayed in the second language (e.g., Spanish) at the time the AUTO additional functional input 512 was activated (and/or the language setting was set to Spanish), the relevant information would have been displayed in the second language. For example, the information corresponding to the AUTO additional functional input 512 would have been displayed, for example, in Spanish again displaying an "Auto" indication, while displaying a current day and time (e.g., "Jue 4:26 PM").

Figure 6:
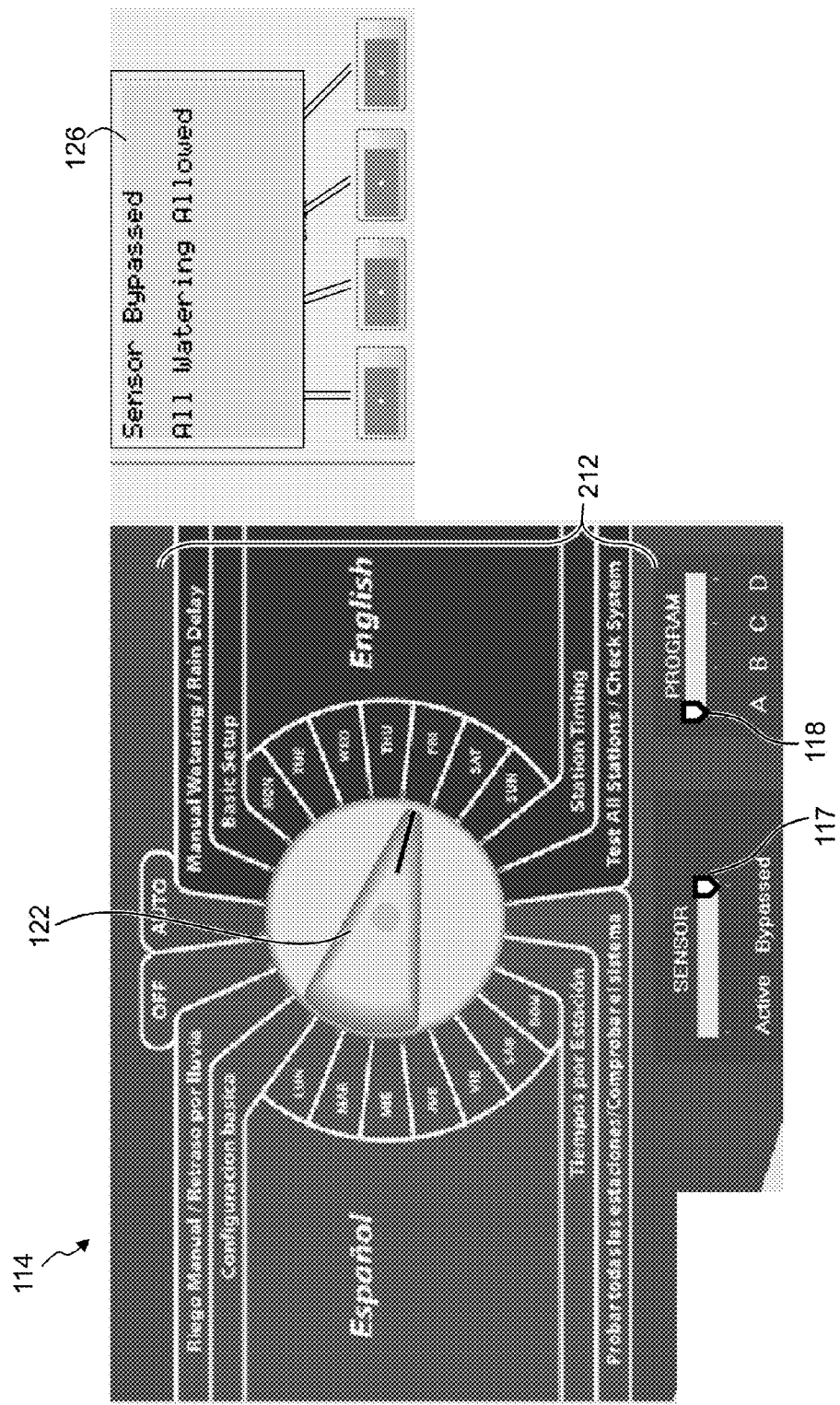
FIG. 6 shows a simplified representation of the exemplary user interface of FIG. 4A, in accordance with some embodiments, with the sensor activation additional functional input activated through a transition from a first state to a second state.

FIG. 6 shows a simplified representation of the exemplary user interface 114 of FIG. 4A, in accordance with some embodiments, with the sensor activation additional functional input 117 activated through a transition from a first state to a second state. Similar to the detection of the AUTO additional functional input, the detection of the activation or transition of the sensor activation functional input 117 does not exclusively correspond to one of the first language or the second language. As such, information displayed on the display 126 corresponding to the function associated with the sensor activation functional input 117 is displayed on the display in the language that was being used to display information at a time an activation of a sensor activation functional input 117 was detected and/or in accordance with the language setting. In the example depicted in FIG. 6, the rotary dial 122 is directed to one of the functional inputs of the first set 212 that exclusively correspond to a first language (in this example, English). As such, the information shown in FIG. 6 as being displayed on the display 126 in relation to the activation of the sensor activation functional input 117 is also in English. Again, in accordance with some embodiments, if information was being displayed at the time the sensor activation functional input 117 was activated, the information corresponding to the function associated with the sensor activation functional input 117 would have been displayed in Spanish (e.g., displaying "Sensor desactivado Permitido todo riego").

Some embodiments perform similar evaluations of the language being used to display information at the time an activation of one of the other additional functional inputs that are not exclusively associated with one of the first or second languages are detected. For example, upon detecting a transition of the program selector functional input 118 (e.g., from Program "A" to Program "B") information corresponding to the function of transitioning between Program A to Program B, if any, would be displayed on the display 126 in the language that was being used at the time the program selector functional input 118 is switched is transitioned by the user from Program A to Program B (and/or in accordance with the language designated in the language setting).

The examples above describe the use of a rotary dial 122 in selecting or activating at least some of the functional inputs that are associated with one of the first or second languages. Some embodiments may additionally or alternatively include one or more buttons, switches, soft buttons, options on a touch screen, or the like, or a combination thereof that can be associated with one of the first or second languages and/or configured to be part of one set of functional inputs of a plurality of sets of functional inputs with each set of functional inputs being associated with a different one of a plurality of different languages. Accordingly, some embodiments, for example, may include a plurality of user selectable buttons configured to be selected by a user, with at least two functional inputs of a first set of functional inputs and at least two functional inputs of a second set of functional inputs are each separate user selectable buttons of the plurality of user selectable buttons, with the first set and the second set being exclusively associated with a different language.

Figure 7:
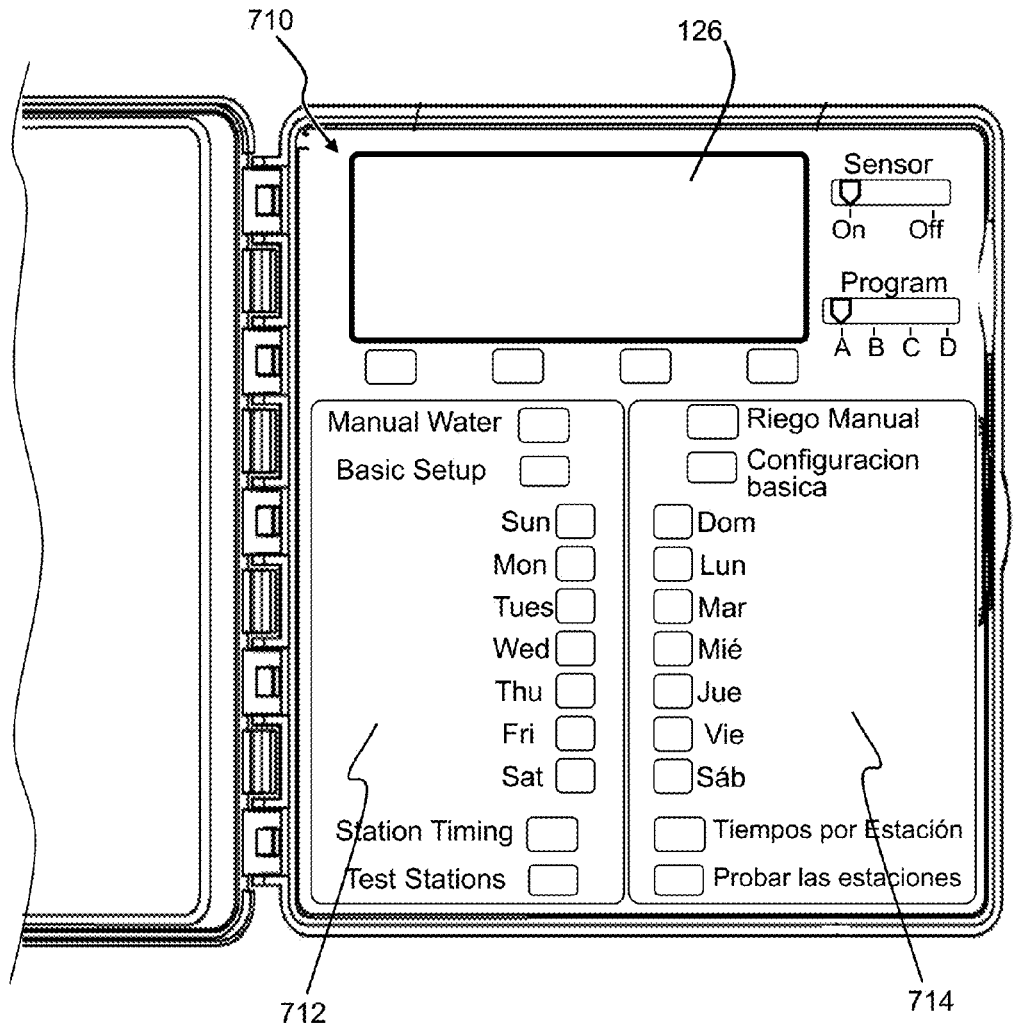
FIG. 7 shows a simplified representation of an exemplary user interface of an irrigation controller, in accordance to some embodiments.

FIG. 7 shows a simplified representation of an exemplary user interface 710 of an irrigation controller, in accordance to some embodiments. The user interface 710 includes a first set 712 of functional inputs exclusively corresponding to a first language, and a second set 714 of functional inputs exclusively corresponding to a second language. In this example, the functional inputs include user selectable buttons that when selected by the user is detected and corresponding functions are implemented through the irrigation controller. Further, labeling is typically also included in the corresponding first and second languages relative to the corresponding functional input of the respective first and second sets of functional inputs.

Again, in some embodiments, the functional inputs of the first set 712 correspond to the functional inputs of the second set 714 such that each function correlated with one of the functional inputs of the first set 712 is also correlated with a corresponding one of the functional inputs of the second set 714. For example, a first function corresponds to both a first user selectable button in the first set 712 associated with the first language and also to a second user selectable button of the second set 714 associated with the second language. Similarly, in some implementations, positional placement of the functional inputs of the first set 712 of functional inputs mirror the placement of the functional inputs of the second set 714 of functional inputs. Further, some embodiments are configured such that each of the functional inputs of both the first set 712 of the functional inputs and the second set 714 of the functional inputs are available for selection by a user at the same time.

Further still, some embodiments are configured so that the user does not have to activate a separate language option, functional input or menu option in order to access the different sets of functional inputs and/or to have corresponding information displayed in a desired one of the first language or the second language. Accordingly, in some implementations, the control circuitry can be configured to direct the information corresponding to a first function to be displayed on the display in only the first language in response to detecting a selection of a first user selectable button that corresponds to the first language, and to direct substantially the same information corresponding to the first function to be displayed on the display in only the second language in response to detecting a selection of the second user selectable button that corresponds to the second language.

Figure 8:
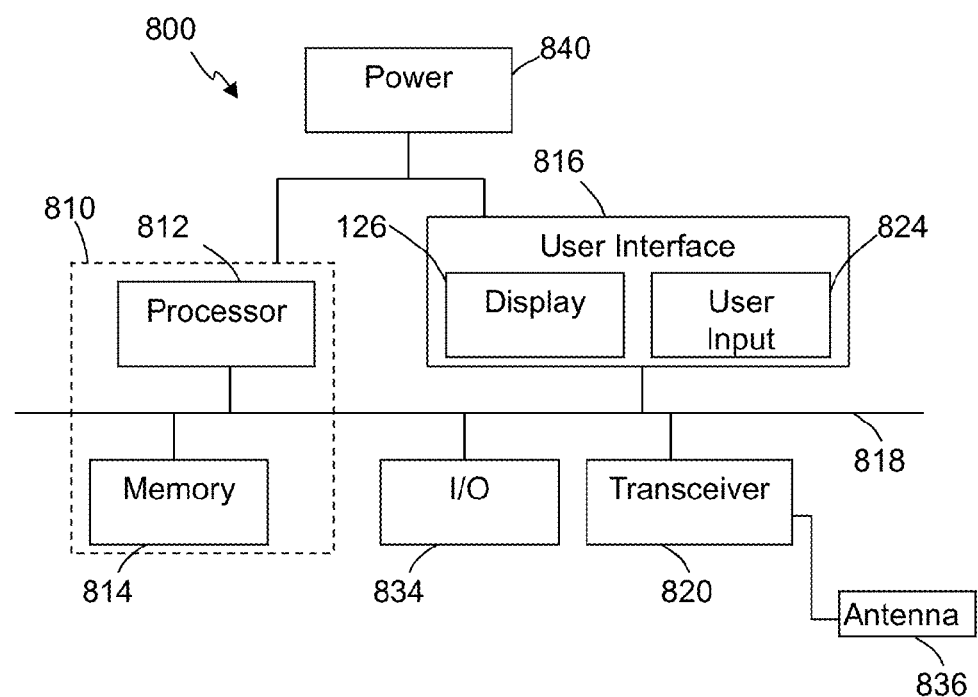
FIG. 8 illustrates exemplary circuitry and/or a system for use in implementing methods, techniques, devices, apparatuses, systems, servers, sources in controlling irrigation and/or allowing a user to interact with an irrigation controller to define parameters, schedules, timing and the like, in accordance with some embodiments.

The methods, techniques, systems, devices, services, servers, sources and the like described herein may be utilized, implemented and/or run on many different types of devices and/or systems. Referring to FIG. 8, there is illustrated circuitry and/or a system 800 that may be used for any such implementations, in accordance with some embodiments. One or more components of the system 800 may be used for implementing any circuitry, system, apparatus or device mentioned above or below, or parts of such circuitry, systems, apparatuses or devices, such as for example any of the above or below mentioned irrigation controllers 110, user interface 114, control panel, controller, control circuitry, display 126, and the like. However, the use of the system 800 or any portion thereof is certainly not required.

By way of example, the system 800 may comprise a controller or processor module 812, memory 814, a user interface 816, and one or more communication links, paths, buses or the like 818. A power source or supply 840 is included or coupled with the system 800. The controller 812 can be implemented through one or more processors, microprocessors, central processing unit, logic, local digital storage, firmware and/or other control hardware and/or software, and may be used to execute or assist in implementing the irrigation control, allowing users to interact with and/or program the irrigation controller, and executing the steps of the processes, methods and techniques described herein, and control various communications, programs, content, listings, services, interfaces, etc. Further, in some embodiments, the controller 812 can be part of a control system 810 and/or implemented through one or more processors with access to one or more memory 814. The user interface 816 can allow a user to interact with the system 800 and receive information through the system. In some instances, the user interface 816 includes a display 126 and/or one or more user inputs 824, such as functional inputs 116-119, a remote control, keyboard, mouse, track ball, buttons, touch screen, etc., which can be part of or wired or wirelessly coupled with the system 800.

Typically, the system 800 further includes one or more communication interfaces, ports, transceivers 820 and the like allowing the system 800 to communication over a communication bus, a distributed network, a local network, the Internet, communication link 818, other networks or communication channels with other devices and/or other such communications or combinations thereof. Further the transceiver 820 can be configured for wired, wireless, optical, fiber optical cable or other such communication configurations or combinations of such communications.

The system 800 comprises an example of a control and/or processor-based system with the controller 812. Again, the controller 812 can be implemented through one or more processors, controllers, central processing units, logic, software and the like. Further, in some implementations the controller 812 may provide multiprocessor functionality.

The memory 814, which can be accessed by the controller 812, typically includes one or more processor readable and/or computer readable media accessed by at least the controller 812, and can include volatile and/or nonvolatile media, such as RAM, ROM, EEPROM, flash memory and/or other memory technology. Further, the memory 814 is shown as internal to the system 810; however, the memory 814 can be internal, external or a combination of internal and external memory. Similarly, some or all of the memory 814 can be internal, external or a combination of internal and external memory of the controller 812. The external memory can be substantially any relevant memory such as, but not limited to, one or more of flash memory secure digital (SD) card, universal serial bus (USB) stick or drive, other memory cards, hard drive and other such memory or combinations of such memory. The memory 814 can store irrigation parameters, irrigation programs and/or schedules, runtimes, irrigation days, code, software, executables, scripts, data, programming, programs, textual content, identifiers, log or history data, user information and the like.

One or more of the embodiments, methods, processes, approaches, and/or techniques described above or below may be implemented in one or more computer programs executable by a processor-based system. By way of example, such a processor based system may comprise the processor based system 800, a standalone irrigation controller, an irrigation controller that operates with one or more other irrigation controller, an irrigation controller in communication with a central controller or computer, a computer, portable user devices, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for allowing a user to interact with an irrigation controller, define irrigation parameters, define irrigation programming, obtain information from the irrigation controller, control irrigation in accordance with irrigation programs, irrigation parameters, runtimes, and the like. As another example, such computer programs may be used for implementing any type of circuitry, tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: by control circuitry, detecting an activation of a first functional input of a plurality of functional inputs of an irrigation controller; causing information corresponding to a function associated with the first functional input to be displayed on a display of an irrigation controller in only a first language when the first functional input is one of a first set of multiple functional inputs of the plurality of functional inputs with each functional input of the first set of functional inputs exclusively corresponding to the first language; and causing the information corresponding to the function associated with the first functional input to be displayed on a display of an irrigation controller in only a second language when the first functional input is one of a second set of multiple functional inputs of the plurality of functional inputs with each functional input of the second set of functional inputs exclusively corresponding to the second language that is different that the first language; wherein each of the functional inputs of both the first set of the functional inputs and the second set of the functional inputs are available for selection by a user at the same time, and wherein each function correlated with one of the functional inputs of the first set of functional inputs is also correlated with a corresponding one of the functional inputs of the second set of functional inputs.

While the invention herein disclosed has been described by means of specific embodiments, examples and applications thereof, numerous modifications and variations could be made thereto by those skilled in the art without departing from the scope of the invention set forth in the claims.

What is claimed is:

1. An irrigation controller, comprising:
   a first set of functional physical inputs each of which is configured to allow a user to physically interact therewith and exclusively corresponding to a first language; and
   a second set of functional physical inputs each of which is configured to allow a user to physically interact therewith and exclusively corresponding to a second language that is different than the first language;
   wherein a function correlated to both a functional physical input of the first set and a corresponding one of the second set is activable by a single user interaction with the functional physical input of one of the first set and the corresponding one of the second set.

2. The irrigation controller of claim 1, further comprising:
   a display; and
   a controller configured to detect an activation by the user of any of the first and second sets of functional inputs, and further configured to:
      direct information corresponding to the function associated with an activated functional input to be displayed on the display in only the first language when the activated functional input is part of the first set of functional inputs; and
      direct information corresponding to the function associated with the activated functional input to be displayed on the display in only the second language when the activated functional input is part of the second set of functional inputs.

3. The irrigation controller of claim 2, further comprising:
   one or more additional functional inputs that are not part of the first set of functional inputs and not part of the second set of functional inputs;
   wherein the irrigation controller is configured to cause additional information to be displayed on the display in one of the first language and the second language that was being used to display information at a time an activation of a first additional functional input of the one or more additional functional inputs is detected.

4. The irrigation controller of claim 2, further comprising:
   one or more additional functional inputs that are not part of the first set of functional inputs and not part of the second set of functional inputs;
   wherein the controller, in response to detecting an activation of a first additional functional input of the one or more additional functional inputs, is further configured to:
      determine which one of the first language and the second language was being used in displaying information at a time the activation of the first additional functional input is detected; and
      cause additional information corresponding to a first additional function correlated to the first additional functional input to be displayed in only one of: the first language when it is determined that the first language was being used in displaying the information at the time the activation of the first additional functional input is detected, and the second language when it is determined that the second language was being used in displaying the information at the time the activation of the first additional functional input is detected.

5. The irrigation controller of claim 1, further comprising:
   a rotary dial configured to be rotated by the user, wherein at least two functional inputs of the first set of functional inputs and at least two functional inputs of the second set of functional inputs are each separate dial positions of the rotary dial.

6. The irrigation controller of claim 2, further comprising:
   a plurality of user selectable buttons, wherein a first functional input of the first set comprises a first user selectable button of the plurality of user selectable buttons and a first functional input of the second set comprises a second user selectable button of the plurality of user selectable buttons; and
   wherein the first function corresponds to both the first user selectable button and the second user selectable button such that the controller is configured to direct the information corresponding to the first function to be displayed on the display in only the first language in response to detecting a selection of the first user selectable button, and to direct the information corresponding to the first function to be displayed on the display in only the second language in response to detecting a selection of the second user selectable button.

7. The irrigation controller of claim 1, further comprising:
   a plurality of user selectable buttons configured to be selected by the user, wherein at least two functional inputs of the first set of functional inputs and at least two functional inputs of the second set of functional inputs are each separate user selectable buttons of the plurality of user selectable buttons.

8. The irrigation controller of claim 1, wherein the irrigation controller is configured to store one or more irrigation runtimes corresponding to one or more station outputs, and to activate the one or more station outputs to trigger one or more external valves in accordance with the stored one or more irrigation runtimes.

9. The irrigation controller of claim 1, wherein each of the functional inputs of both the first set and the second set are available for activation by the user without the user selecting a separate language option.

10. The irrigation controller of claim 1, wherein positions of the functional inputs of the second set mirror positions of the functional inputs of the first set.

11. A method of controlling irrigation, comprising:
    by control circuitry of an irrigation controller configured to control irrigation, detecting an activation of a first functional input of a plurality of functional inputs of the irrigation controller;

causing information corresponding to a function associated with the first functional input to be displayed on a display of the irrigation controller in only a first language when the first functional input is one of a first set of multiple functional inputs of the plurality of functional inputs with each functional input of the first set of functional inputs exclusively corresponding to the first language; and causing the information corresponding to the function associated with the first functional input to be displayed on a display of the irrigation controller in only a second language when the first functional input is one of a second set of multiple functional inputs of the plurality of functional inputs with each functional input of the second set of functional inputs exclusively corresponding to the second language that is different that the first language;

wherein a function correlated to both a functional input of the first set and a corresponding one of the second set is activable by a single user interaction with the functional physical input of one of the first set and the corresponding one of the second set.

12. The method of claim 11, wherein the detecting the activation of the first functional input comprises detecting a rotation by the user of a rotary dial to a first predefined dial position of a plurality of separate predefined dial positions of the rotary dial, and wherein at least two functional inputs of the first set of functional inputs and at least two functional inputs of the second set of functional inputs are each separate dial positions of the rotary dial.

13. The method of claim 12, further comprising:
detecting an activation of a first additional functional input of one or more additional functional inputs that are not part of the first set of functional inputs and not part of the second set of functional inputs;
determining which one of the first language and the second language was being used in displaying information at a time the activation of the first additional functional input is detected;
causing additional information corresponding to the first additional function correlated to the first additional functional input to be displayed in the first language when it is determined that the first language was being used in displaying the information at the time the activation of the first additional functional input is detected; and
causing the additional information corresponding to the first additional function correlated to the first additional functional input to be displayed in the second language when it is determined that the second language was being used in displaying the information at the time the activation of the first additional functional input is detected.

14. The method claim 11, further comprising:
detecting an activation of an additional functional inputs that is not part of the first set of functional inputs and not part of the second set of functional inputs; and
causing additional information to be displayed on the display in one of the first language and the second language that was being used to display information at a time an activation of a first additional functional input is detected.

15. The method of claim 11, wherein the detecting the activation of the first functional input comprises detecting a selection by the user of a first selectable button of a plurality of selectable buttons configured to be selected by a user.

16. The method of claim 11, wherein a first function is correlated to the first functional input of the first set of functional inputs and further correlated to a second functional input of the second set of functional inputs.

17. The method of claim 11, further comprising:
storing, at the irrigation controller, one or more irrigation runtimes corresponding to one or more station outputs; and
activating the one or more station outputs to trigger one or more external water valves in accordance with the stored one or more irrigation runtimes.

18. The method of claim 11, further comprising:
providing the functional inputs of the first set of the functional inputs and the second set of the functional inputs such that each of the functional inputs of both the first set of the functional inputs and the second set of the functional inputs are available for selection by a user without the user selecting a separate language option.

19. The method of claim 18, wherein the functional inputs of the second set of the functional inputs mirror the functional inputs of the first set of the functional inputs.

20. A method of controlling irrigation, comprising:
by control circuitry of an irrigation controller configured to control irrigation,
providing, on the irrigation controller, a first set of functional inputs with each functional input of the first set of functional inputs exclusively corresponding to a first language, wherein the first set of the functional inputs comprises multiple functional inputs; and
providing, on the irrigation controller, a second set of functional inputs with each functional input of the second set of functional inputs exclusively corresponding to a second language that is different that the first language, wherein the second set of the functional inputs comprises multiple functional inputs;
wherein a function correlated to both a the functional physical input of the first set and a corresponding one of the second set is activable by a single user interaction with the functional physical input of one of the first set and the corresponding one of the second set.

21. The method of claim 20, further comprising:
detecting an activation by the user of any of the first and second sets;
directing information corresponding to a function associated with an activated functional input to be displayed on a display of the irrigation controller in only the first language when the activated functional input is part of the first set; and
directing information corresponding to the function associated with the activated functional input to be displayed on the display in only the second language when the activated functional input is part of the second set.

* * * * *